United States Patent
Kim (10) Patent No.: US 7,206,945 B2
(45) Date of Patent: Apr. 17, 2007

(54) PARALLEL DISTRIBUTED SAMPLE DESCRAMBLING APPARATUS OF PASSIVE OPTICAL NETWORK AND METHOD THEREOF

(75) Inventor: Ji-Hong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 10/317,186

(22) Filed: Dec. 12, 2002

(65) Prior Publication Data
US 2003/0118184 A1    Jun. 26, 2003

(30) Foreign Application Priority Data
Dec. 13, 2001 (KR) .............................. 2001-78951

(51) Int. Cl.
*H04K 9/00* (2006.01)
(52) U.S. Cl. .................. 713/300; 370/395.1; 375/365; 380/268
(58) Field of Classification Search ............. 370/395.1; 375/365; 380/268; 713/300
See application file for complete search history.

(56) References Cited

U.S. PATENT DOCUMENTS 5,241,602 A * 8/1993 Lee et al. .................. 380/268
5,448,640 A * 9/1995 Kim et al. .................. 380/268
6,327,262 B1 * 12/2001 Jeong ....................... 370/395.1
6,408,077 B1 * 6/2002 Prunier ....................... 380/216
6,414,957 B1 * 7/2002 Kang et al. ............... 370/395.1

OTHER PUBLICATIONS

Byeong Gi Lee and Seok Chang Kim, "Low-Rate Parallel Scrambling Techniques for Today's Lightwave Transmission", IEEE Communications Magazine, Apr. 1995.*

* cited by examiner

Primary Examiner—Chun Cao
Assistant Examiner—Albert Wang
(74) Attorney, Agent, or Firm—Ked & Associates LLP (57) ABSTRACT

Disclosed is a parallel distributed sample descrambling (DSS) apparatus and a method that lowers a clock speed of 622 MHz into ⅛ speed (77.76 MHz) and operates a serial descrambling processing in unit of bit by converting the processing into a parallel descrambling processing in unit of byte, power consumption can thus be reduced and a sufficient timing margin can be secured. The parallel DSS apparatus includes a serial-parallel conversion unit for converting receiving data into parallel data (D[7:0]) and generating a counter signal, a header error check (hereinafter, as HEC) generation unit for generating HEC data of the receiving data by CRC calculation, and abstracting upper two bits of the HEC data, and a descrambling processing unit for performing parallel descrambling of byte module by receiving output signals of the serial-parallel conversion unit and the HEC generation unit.

27 Claims, 9 Drawing Sheets

PARALLEL DISTRIBUTED SAMPLE DESCRAMBLING APPARATUS OF PASSIVE OPTICAL NETWORK AND METHOD THEREOF

BACKGROUND OF THE INVENTION

1. Field of the Invention

The present invention relates to distributed sample scrambling and descrambling, and more particularly to distributed sample descrambling of a parallel distributed sample of a asynchronous transfer mode passive optical network.

2. Background of the Related Art

Figure 1:
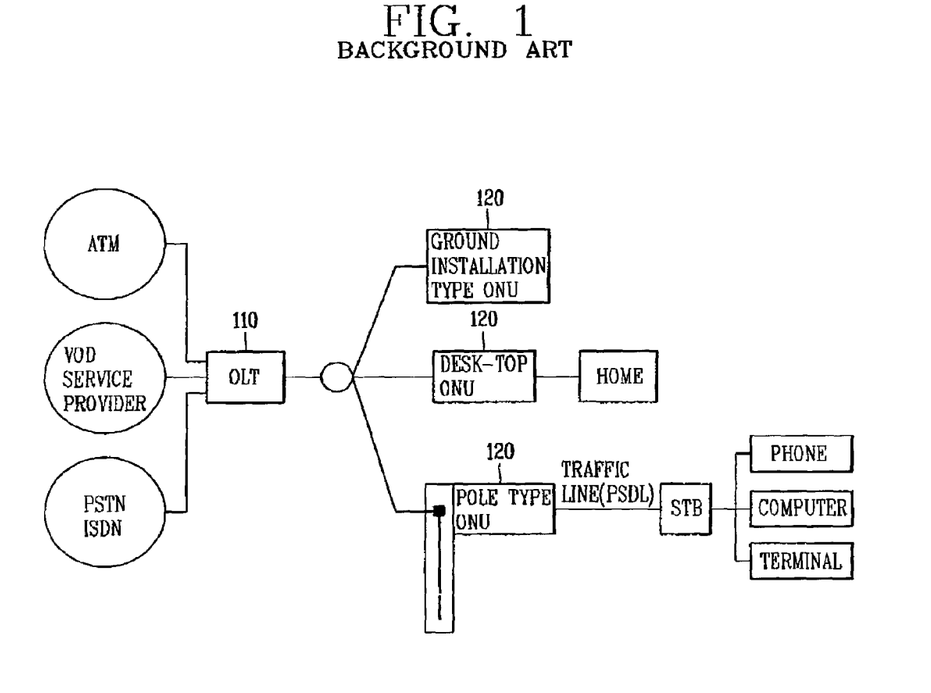
FIG. 1 is a drawing showing a related art PON.

A Passive Optical Network (PON) is an optical subscriber net structure used for achieving economic efficiency by sharing an optical line by manually branching the line into a plurality of lines. An Asynchronous Transfer Mode (ATM) PON is a point-to-multipoint system for transmitting information of an optical line termination (OLT) of a central office to an optical network unit (ONU) of an end user using two wavelengths of 1300 nm and 1500 nm FIG. 1 illustrates a related art PON. As shown in FIG. 1, when data transmitted through the ATM, PSTN, or ISDN is transmitted to an OLT 110, the OLT 110 transmits the data to an ONU 120 through an optical line. Transmission in the reverse direction is performed with the same procedure. The ONU 120 is connected to a terminal of a user. There are various types of ONUs. These include a ground installation type, an office installation type, a desk top type, a poll installation type, and others.

ITU-T G.983.1 is an international standard entitled Broadband Optical Access systems based on PON, and describes an interface and optical signals of a very high speed optical connection system ITU-T G.983.1 recommends that data transmitted from the OLT 110 to the ONU 120 (that is, downstream data) be scrambled. When the OLT 110 transmits data after scrambling the data using a characteristic polynomial of $(X^{31}+X^{28}+1)$ the ONU 120 restores the original signal by descrambling the receiving signal again. The characteristic polynomial used in descrambling is same as that of the scrambling.

Various scrambling/descrambling methods are used. These include self synchronous scrambling (SSS), frame synchronous scrambling (FSS), distributed sample scrambling (DSS), and others.

With respect to the FSS, the scrambling/descrambling apparatuses are reset when the respective frames are started. FSS is a scrambling method which is used when the frame is large.

The SSS method is used in a physical layer of a Synchronous Digital Hierarchy (SDH) base, and has a characteristic polynomial of $(X^{43}+1)$. In this method, since respective states of a Pseudo random bit sequence (PRBS) generation unit depend on an input signal, the synchronous state is restored by itself even if the synchronous states of the scrambler and descrambler are seceded by a transmission error. Therefore, since the SSS method does not require the frame synchronizing process, the implementation is easy, but an input error of 1 bit is increased to output error of 2 or more bits, since the transmission error affects the state of the PRBS generation unit.

On the other hand, since a cell header is not scrambled in cell-based transmission, the DSS method is used. DSS uses a characteristic polynomial of $(X^{31}+X^{28}+1)$, and transmits an ATM cell header and a user information section by scrambling them. This method requires an operation for synchronizing the PRBS generation units of the sending side and receiving side. Accordingly, the PRBS signal of the sending side is transmitted to the receiving side by operating the upper two bits of the header error check (HEC).

Figure 2:
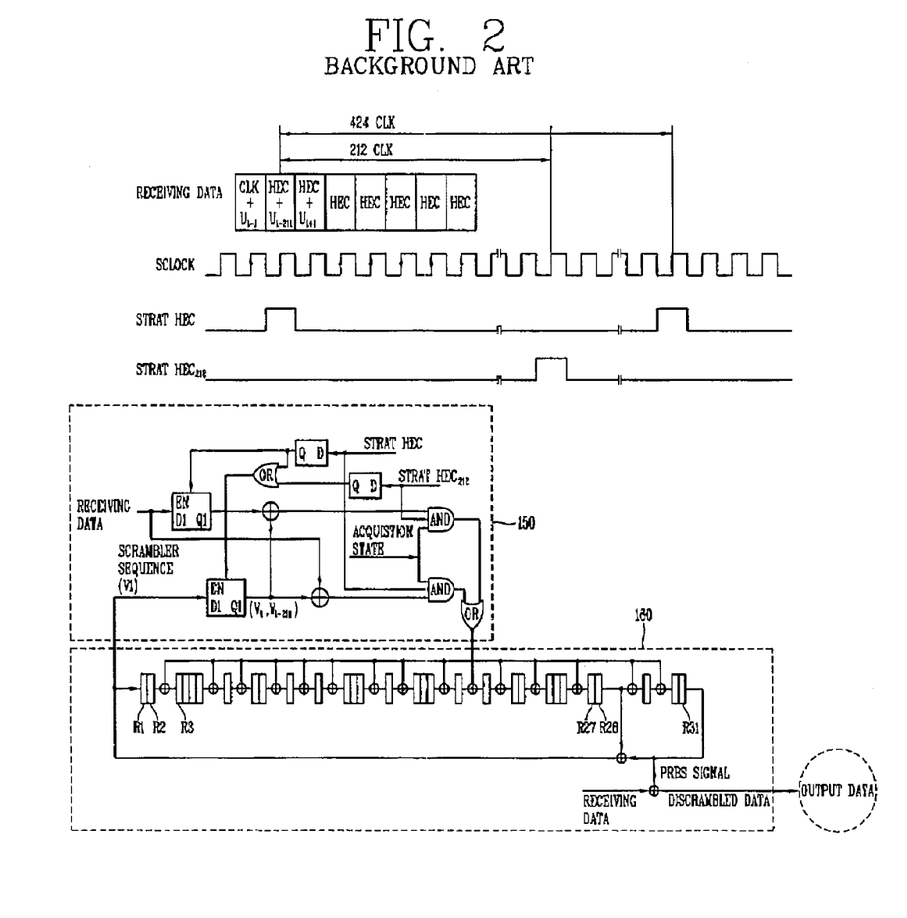
FIG. 2 is a block diagram showing a related art distributed sample descrambling apparatus.

FIG. 2 shows the related art DSS apparatus. As shown in FIG. 2, the related art DSS apparatus processes data in a clock speed of 622 MHz in a serial processing method of bit units.

The related art DSS apparatus includes a correction vector generation unit 150 for outputting a correction vector of '1' when the PRBS synchronizing signals of the sending side and the receiving side are different, and a PRBS processing unit 160 for generating the PRBS signal.

The PRBS synchronizing signals are PRBS signals of the sending/receiving sides which are compared in a specific moment for descrambling downstream data.

The correction vector generation unit 150 compares the PRBS synchronizing signals of the sending side and the receiving side when the receiving data is in an acquisition state and the Start HEC (424 clock period) signal or Start $HEC^{212}$ is set to a high level. When the two synchronizing signals are different, the correction vector generation unit 150 generates a correction vector K having a value of "1," transmits the value into the PRBS processing unit 160, and corrects the PRBS signal into the correction vector K.

The PRBS processing unit 160 includes a plurality of shift registers R1~R31 for sequentially shifting an input signal in every predetermined period. The PRBS processing unit 160 performs an exclusive-OR (XOR) operation on the output signal of the shift register R28 and output signal of the shift register R31, and applies the operation result value V to The shift register R1. Then, the PRBS processing unit 160 restores the received data into the original signal (descrambled signal) by performing the exclusive-OR operation on the output signal of the shift register R31 and the received data.

When the Start HEC signal or Start $HEC^{212}$ signal is set at a high level, the correction vector generation unit 150 receives the operation result value V as the PRBS synchronizing signal of the receiving end.

The related art DSS system and method has various problems. For example, since the DSS method serially processes the receiving data at a high clock speed of 622 MHz, much power is consumed, and the timing margin is not sufficient. Also, since the timing margin is not sufficient, the operation of the descrambling apparatus is unstable.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a parallel distributed sample descrambling method and apparatus having an identical signal processing ratio and having a more sufficient timing margin than a high speed serial DSS apparatus.

In order to achieve at least these objects in whole or in parts, there is provided a parallel distributed sample descrambling apparatus, including a serial-parallel conversion unit for converting receiving data into parallel data (D[7:0]) and generating a counter signal, a header error check (HEC) generation unit for generating HEC data of the receiving data by CRC calculations, and abstracting upper two bits of the HEC data, and a descrambling processing unit for performing parallel descrambling of byte module by receiving output signals of the serial-parallel conversion unit and the HEC generation unit.

Additionally, in order to achieve at least these objects in whole or in parts, there is provided a method for descrambling a parallel distributed sample, including the steps of converting a received ATM cell signal into a parallel signal (D[7:0]), generating a counter signal and a ⅛ speed clock signal (B-clock) of a sending end, generating HEC data of the received ATM cell signal by a CRC operation of header data of the received ATM cell signal, and abstracting upper two bits (Y[1:0]) of the generated HEC data, generated a PRBS signal, generating a PRBS HEC signal by performing the CRC operation of the initial four bytes of the PRBS signal and restoring the original signal in unit of byte by receiving the parallel data (D[7:0]), two bits (Y[1:0]) signal, PRBS signal and the PRBS HEC signal.

Additional advantages, objects, and features of the invention will be set forth in part in the description which follows and in part will become apparent to those having ordinary skill in the art upon examination of the following or may be leaned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 3:
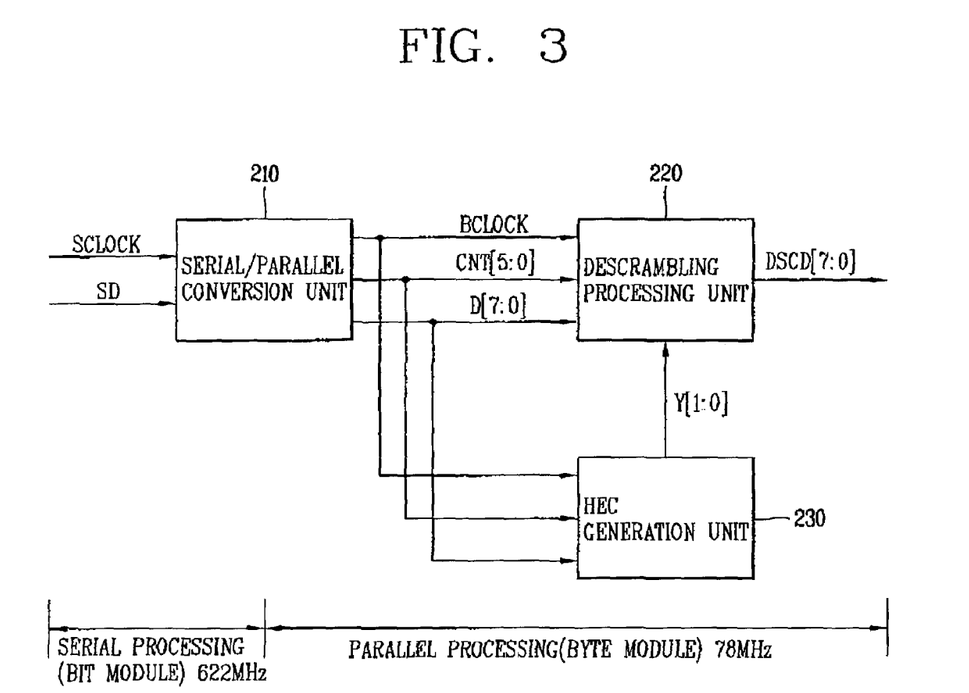
FIG. 3 is a block diagram showing a parallel distributed sample descrambling (DSS) apparatus in accordance with a preferred embodiment of the present invention.
Figure 4:
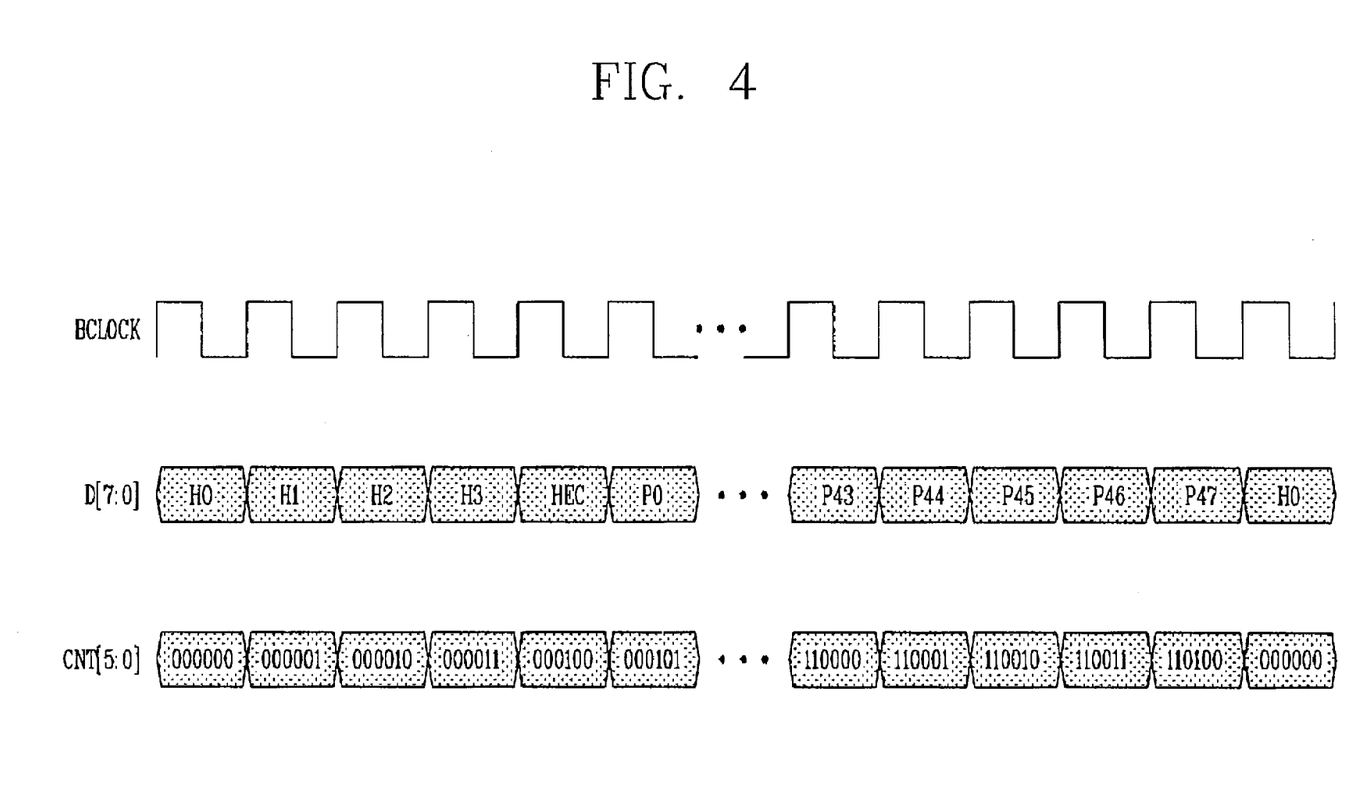
FIG. 4 is a drawing showing timing of output signals of a serial/parallel conversion unit of FIG. 3.

FIG. 3 is a block diagram showing a parallel distributed sample descrambling (DSS) apparatus in accordance with the preferred embodiment. FIG. 4 is a drawing showing a timing of output signals of the serial/parallel conversion unit 210 of FIG. 3.

As shown in FIG. 3, the parallel DSS apparatus in accordance with the preferred embodiment includes a serial/parallel conversion unit 210 for receiving inputted sea data SD in bit units and at a clock speed of 622 MHz and converting the serial data into parallel data (D[7:0])of a byte unit and having a clock speed Of 77.6 MHz The serial/parallel conversion unit 210 outputs the converted data. Next the serial/parallel conversion unit 210 includes a Header Error Check (HEC) generation unit 230 for abstract the upper two bits of HEC data generated by performing a CRC operation of a header portion of a received ATM cell signal. The serial/parallel conversion unit also includes a descrambling processing unit 220 for performing parallel descrambling of byte units by receiving an output signal of serial/parallel conversion unit 210 and HEC generation unit 230.

When a ATM cell serial data SD transmitted at a clock speed of 622 MHz is inputted to a serial/parallel conversion unit 210, the serial/parallel conversion unit 210 distinguishes a cell border, and outputs The serial data signal SD by converting the signal into a parallel data signal (D[7:0]) having a clock speed of 77.76 Mz. That is, the clock speed is reduced to ⅛ of the original clock signal.

Referring to FIG. 4, the serial/parallel conversion unit 210 starts counting when a first byte of the ATM cell is outputted, and ends counting when the last byte of the payload is outputted. Therefore, the counter signal CNT has a period of "$000000_{(2)}(0_{(10)})$~$110100_{(2)}(52_{(10)})$", and the period is repeated in each ATM cell. It should be understood that the length of the ATM cell is 53 byte and the ATM cell is composed of a header of 5 bytes (1~5$^{th}$ byte) and a payload of 48 bytes (6~53$^{rd}$ byte).

Referring again. to FIG. 3, the HEC generation unit 230 receives ATM cell parallel data (D[7:0]) of the serial/parallel conversion unit 210 and performs a cyclic redundancy check (CRC) operation (generator polynomial: $X^8+X^2+X+1$) of the header portion (CNT=0~3) The CRC result data of 8 bytes, that is, a most significant bit (MSB) of the HEC byte and the next bit, are respectively set as values of Y[0] and Y[1], and the HEC generation unit 230 outputs the Y[1:0] to the descrambling processing unit 220 when the value of CNT is 4.

On the other hand, the descrambling processing unit 220 receives parallel data (D[7:0]) from the serial/parallel conversion unit 210, and receives Y[1:0] also from the HEC generation unit 230. The descrambling processing unit 220 thus outputs parallel data (DSCD[7:0]) descrambled as a byte unit.

Figure 5:
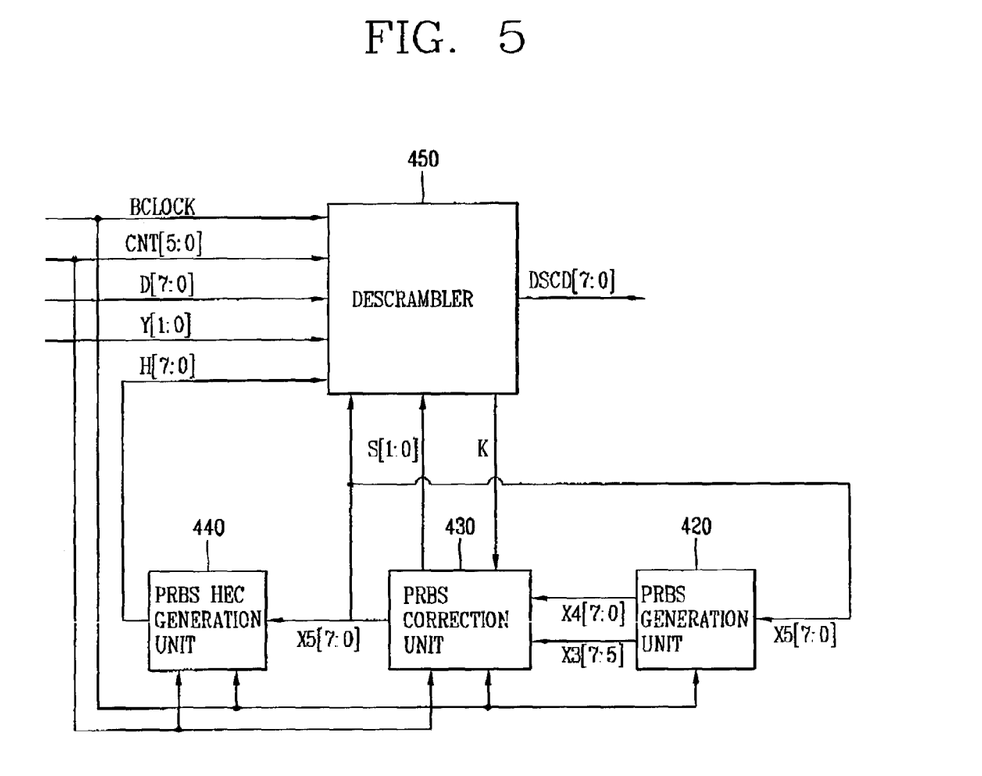
FIG. 5 is a drawing showing a descrambling processing unit in accordance with a preferred embodiment of the present invention.

FIG. 5 is a detail view showing the descrambling processing unit 220 in accordance with the preferred embodiment.

As shown in FIG. 5, the descrambling processing unit 220 preferably includes a PRBS generation unit 420 for generating a PRBS number sequence (X4[7:0] & X3[7:5]), and a PRBS correction unit 430 for generating a PRBS signal (X5[7:0]) by performing an exclusive-OR operation of a correction vector and PRBS number sequence (X4[7:0] & X3[7:5]), and to abstract a two-bit PRBS synchronizing signal (S[1:0]) from the PRBS signal (X5[7:0]). The descrambling processing unit 220 further includes a PRBS HEC generation unit 440 for generating a PRBS HEC signal by performing a CRC operation of the initial four bytes of the PRBS signal and a descrambler 450 for outputting the correction vector into the PRBS correction unit 430 by generating the vector, and restoring the original signal by performing an exclusive-OR operation of the parallel data (D[7:0]), PRBS signal, and PRBS HEC signal The descrambling processing unit 220 is preferably positioned in the ONU, and is operated at a clock speed of 77.76 MHz. When the scrambled downstream data is transmitted to the ONU from the OLT, the descrambling processing unit 220 of the ONU performs a distributed sample descrambling process having a characteristic polynomial of $X^{31}+X^{28}+1$ to restore the scrambled data to the original data. The process is a parallel processing process.

Figure 6:
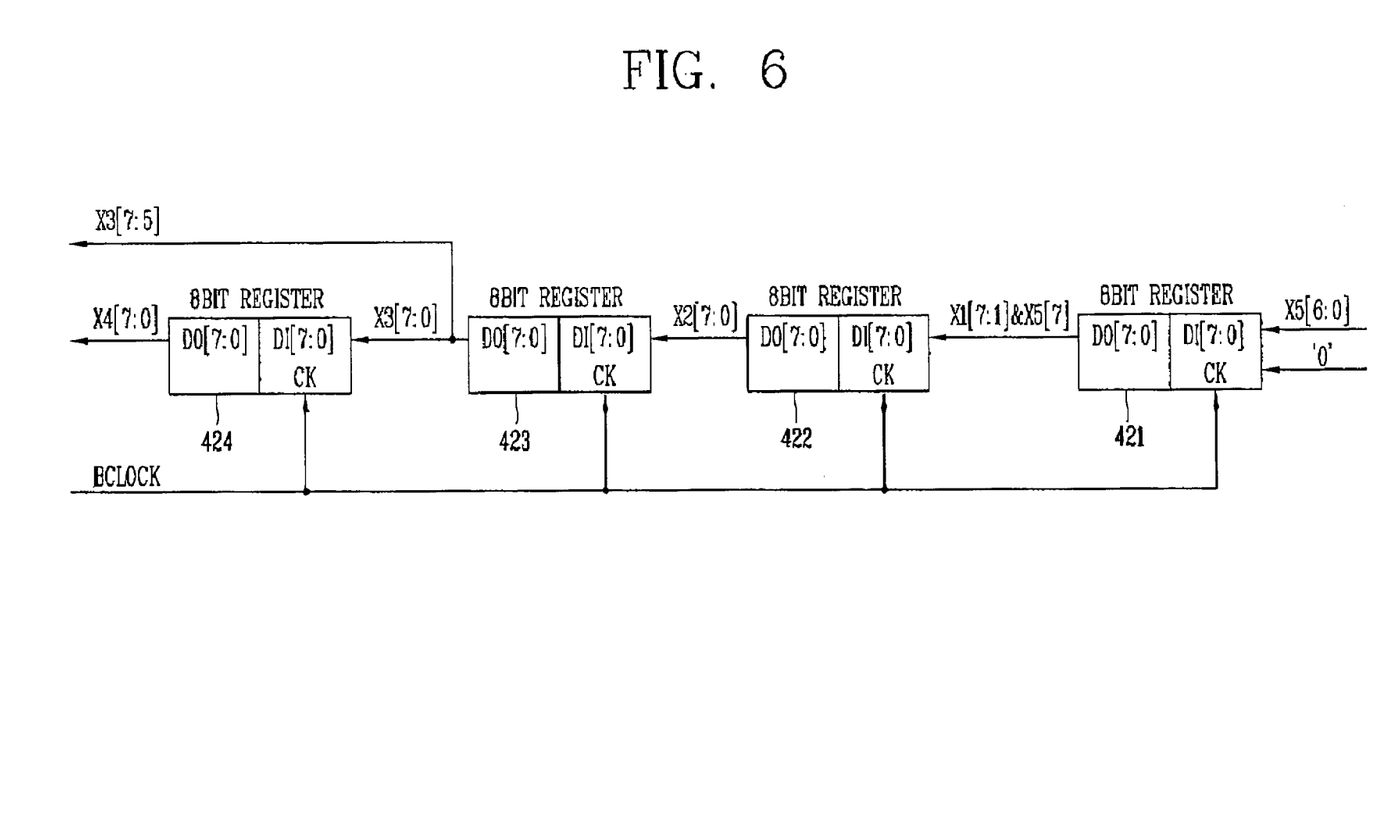
FIG. 6 is a drawing showing a PRBS generation unit in accordance with a preferred embodiment of the present invention.

FIG. 6 is a drawing showing the PRBS generation unit 420. As shown in FIG. 6, the PRBS generation unit 420 outputs the PRBS number sequence (X4[7:0] & X3[7:5]) by receiving the output signal of the PRBS correction unit 430, i.e., the PRBS signal (X5[7:0]). The PRBS generation unit 420 includes four 8-bit register composed of flip flops.

The PRBS signal (X5[7:0]) outputted from the PRBS correction unit 430 is fed-back to a first register 421 of the PRBS generation unit 420. The first register 421 outputs X1[7:1] by having an input signal of some bits (X5[6:0]) of the PRBS feedback signal(X5[7:0]) and null value ('0') A second register 422 receives the output signal (X1[7:1]) of the first register 421 and the remaining X5 bit (X5[7]) of the PRBS feedback signal (X5[7:0]) to generate X2[7:0]. A third register 423 outputs X3[7:0] by receiving the output signal (X2[7:0]) of the second register 422. A fourth register 424 outputs (X4[7:0]) by receiving the output signal X3[7:0]) of the third register 423.

The output signal (X4[7:0]) of the fourth register 424 and a partial output signal (X3[7:5]) of the third register 423 are output signals of the PRBS generation unit 420.

An initial value of the flip flop inside the PRBS generation unit 420 is preferably '1'.

Figure 7:
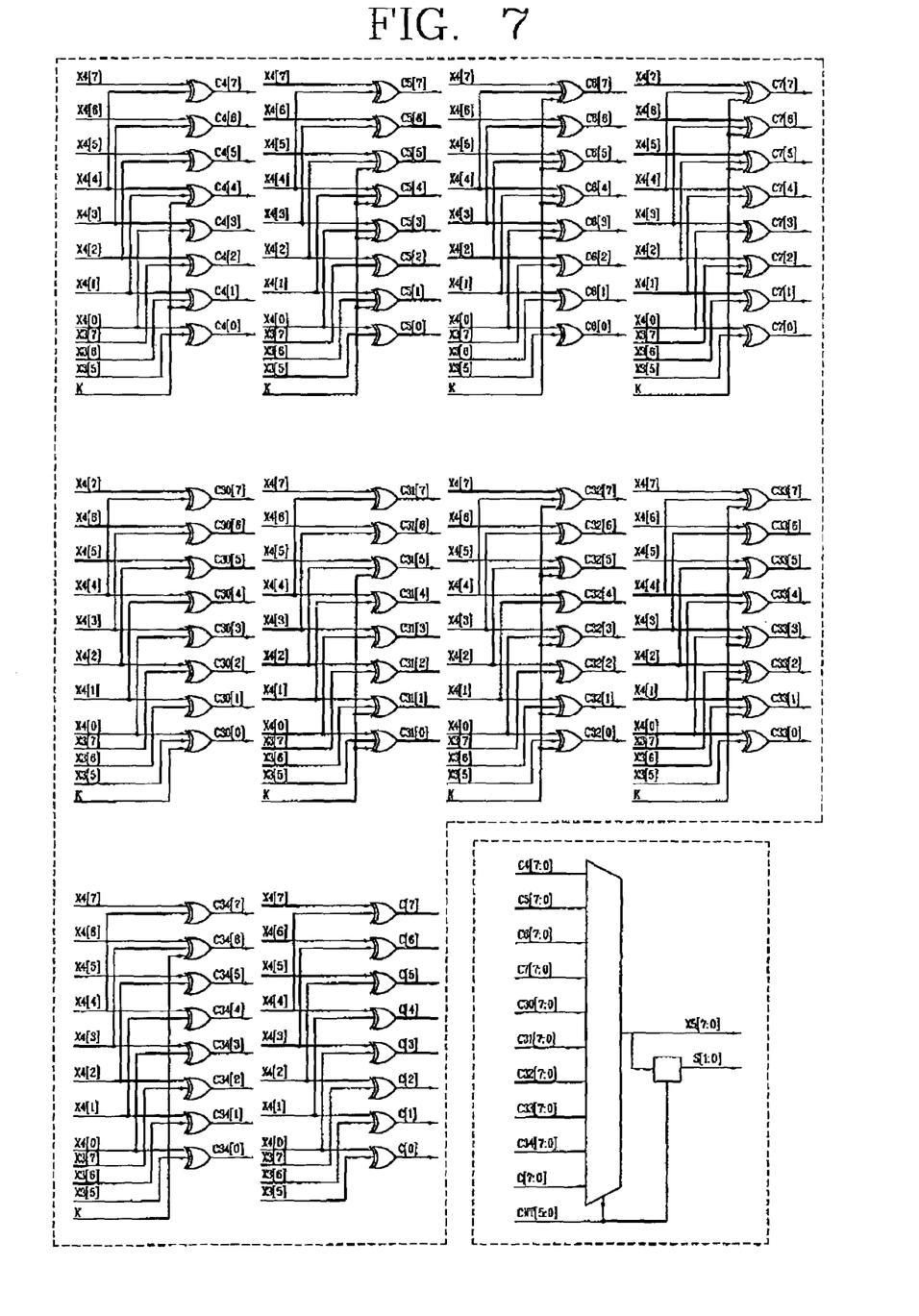
FIG. 7 is a drawing showing a PRBS correction unit in accordance with a preferred embodiment of the present invention.

FIG. 7 illustrates additional detail of the PRBS correction unit 430. As shown in FIG. 7, the PRBS correction unit 430 receives the PRBS number sequence (X4[7:0] & X3[7:5]) outputted from the PRBS generation unit 420 and a correction vector K of the descrambler 450. Then, as shown in table 1, the PRBS signal (X5[7:0]) is generated by performing different exclusive-OR operations according to the CNT signal.

Also, the PRBS correction unit 430 sets two bits as the PRBS synchronizing signal (S[1:0]) by abstracting the two bits from the PRBS signal. S[1] is the second bit (X5[6]) of the PRBS signal when the count signal is $4_{(10)}$, and S[0] is the upper sixth bit (X5[2]) of the PRBS signal when the count signal is $30_{(10)}$.

If the PRBS synchronizing signal of the sending side and the PRBS synchronizing signal (S[1:0]) of the receiving side are different the value of the correction vector K is set as '1'.

TABLE 1

| CNT = 4 | CNT = 5 | CNT = 6 |
|---|---|---|
| X5[7] = X4[7] XOR X4[4] | X5[7] = X4[7] XOR X4[4] | X5[7] = X4[7] XOR X4[4] XOR K |
| X5[6] = X4[6] XOR X4[3] | X5[6] = X4[6] XOR X4[3] | X5[6] = X4[6] XOR X4[3] |
| X5[5] = X4[5] XOR X4[2] | X5[5] = X4[5] XOR X4[2] XOR K | X5[5] = X4[5] XOR X4[2] XOR K |
| X5[4] = X4[4] XOR X4[1] XOR K | X5[4] = X4[4] XOR X4[1] XOR K | X5[4] = X4[4] XOR X4[1] XOR K |
| X5[3] = X4[3] XOR X4[0] | X5[3] = X4[3] XOR X4[0] XOR K | X5[3] = X4[3] XOR X4[0] XOR K |
| X5[2] = X4[2] XOR X3[7] | X5[2] = X4[2] XOR X3[7] | X5[2] = X4[2] XOR X3[7] |
| X5[1] = X4[1] XOR X3[6] XOR K | X5[1] = X4[1] XOR X3[6] XOR K | X5[1] = X4[1] XOR X3[6] |
| X5[0] = X4[0] XOR X3[5] | X5[0] = X4[0] XOR X3[5] | X5[0] = X4[0] XOR X3[5] |
| CNT = 7 | CNT = 30 | CNT = 31 |
| X5[7] = X4[7] XOR X4[4] XOR K | X5[7] = X4[7] XOR X4[4] | X5[7] = X4[7] XOR X4[4] |
| X5[6] = X4[6] XOR X4[3] XOR K | X5[6] = X4[6] XOR X4[3] | X5[6] = X4[6] XOR X4[3] |
| X5[5] = X4[5] XOR X4[2] XOR K | X5[5] = X4[5] XOR X4[2] | X5[5] = X4[5] XOR X4[2] XOR K |
| X5[4] = X4[4] XOR X4[1] | X5[4] = X4[4] XOR X4[1] | X5[4] = X4[4] XOR X4[1] |
| X5[3] = X4[3] XOR X4[0] | X5[3] = X4[3] XOR X4[0] | X5[3] = X4[3] XOR X4[0] |
| X5[2] = X4[2] XOR X3[7] XOR K | X5[2] = X4[2] XOR X3[7] | X5[2] = X4[2] XOR X3[7] |
| X5[1] = X4[1] XOR X3[6] | X5[1] = X4[1] XOR X3[6] | X5[1] = X4[1] XOR X3[6] XOR K |
| X5[0] = X4[0] XOR X3[5] | X5[0] = X4[0] XOR X3[5] XOR K | X5[0] = X4[0] XOR X3[5] XOR K |
| CNT = 32 | CNT = 33 | CNT = 34 |
| X5[7] = X4[7] XOR X4[4] XOR K | X5[7] = X4[7] XOR X4[4] XOR K | X5[7] = X4[7] XOR X4[4] |
| X5[6] = X4[6] XOR X4[3] | X5[6] = X4[6] XOR X4[3] | X5[6] = X4[6] XOR X4[3] XOR K |
| X5[5] = X4[5] XOR X4[2] XOR K | X5[5] = X4[5] XOR X4[2] | X5[5] = X4[5] XOR X4[2] |
| X5[4] = X4[4] XOR X4[1] | X5[4] = X4[4] XOR X4[1] | X5[4] = X4[4] XOR X4[1] |
| X5[3] = X4[3] XOR X4[0] XOR K | X5[3] = X4[3] XOR X4[0] XOR K | X5[3] = X4[3] XOR X4[0] |
| X5[2] = X4[2] XOR X3[7] | X5[2] = X4[2] XOR X3[7] XOR K | X5[2] = X4[2] XOR X3[7] |
| X5[1] = X4[1] XOR X3[6] XOR K | X5[1] = X4[1] XOR X3[6] XOR K | X5[1] = X4[1] XOR X3[6] |
| X5[0] = X4[0] XOR X3[5] XOR K | X5[0] = X4[0] XOR X3[5] | X5[0] = X4[0] XOR X3[5] |
| CNT = all other values | | |
| X5[7] = X4[7] XOR X4[4] | | |
| X5[6] = X4[6] XOR X4[3] | | |
| X5[5] = X4[5] XOR X4[2] | | |
| X5[4] = X4[4] XOR X4[1] | | |
| X5[3] = X4[3] XOR X4[0] | | |
| X5[2] = X4[2] XOR X3[7] | | |
| X5[1] = X4[1] XOR X3[6] | | |
| X5[0] = X4[0] XOR X3[5] | | |

The PRBS HEC generation unit 440 receives the PRBS signal (X5[7:0]) and generates a PRBS HEC signal (H[7:0]) by performing a CRC operation of the PRBS signal (X5[7:0]) when the CNT is 0, 1, 2 or 3, i.e., the header data (H0~H3).

Figure 8:
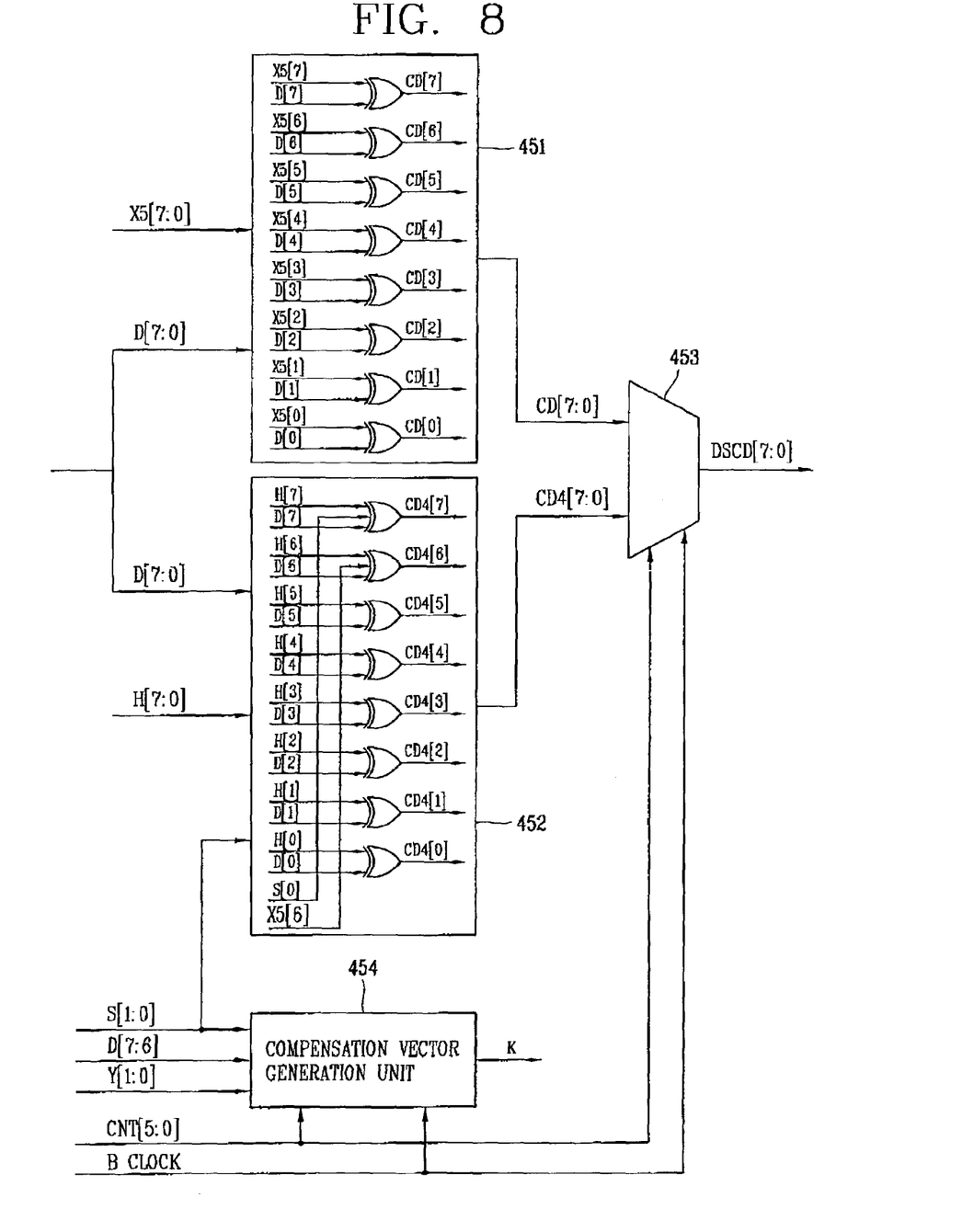
FIG. 8 is a drawing showing a descrambler in accordance with a preferred embodiment of the present invention.

FIG. 8 illustrates additional detail of the descrambler. As shown in FIG. 8, the descrambler 450 preferably includes a correction vector generation unit 454, which determines the correction vector value by comparing the PRBS synchronizing signal of the sending end and the PRBS synchronizing signal (S[1:0]) and outputs the correction vector value to the PRBS correction unit 430. The descrambler 450 additionally includes a fast desrambling unit 451 for performing an exclusive-OR operation of the parallel signal (D[7:0]) and the PRBS signal (X5[7:0]), a second descrambling unit 452 for performing the exclusive-OR operation of the parallel signal (D[7:0]) and the PRBS HEC signal (H[7:0]), and a selecting output unit 453 which outputs the operation result of the second descrambling unit 452 when the CNT is 4 and outputs the operation result of the first descrambling unit 451 when the CNT is the rest.

The correction vector generation unit 454 sets the correction vector value K as '1' when the PRBS synchronizing signal of the sending end and the PRBS synchronizing signal (S[1:0]) are different. That is, when the receiving data are under the acquisition state and the value of CNT is 4, the descrambler 450 compares the operation result value S[0] by performing an exclusive-OR operation of D[7] and Y[0]. If the two values are different, the correction vector K is outputted as '1' when the CNT is 4, 5, 6 or 7. When the CNT is 4, the result value of the exclusive-OR operation of D[6] and Y[1] is CD.

When the receiving data are under the acquisition state and the value of CNT is 30, the descrambler 450 compares the CD value and S[1]. If the two values are different, the correction vector K is outputted as '1' when the value of CNT is 30, 31, 32, 33 or 34.

The PRBS synchronizing signal of the sending side is obtained by performing an exclusive-OR operation of the upper two bits of the HEC byte abstracted from the receiving ATM cell (D[7:6] when the CNT is 4) and the output signal (Y[1:0]) of The HEC generation unit 230.

Table 2 illustrates the exclusive-OR operation of the first and second descrambling units 451 and 452.

TABLE 2

| CNT = 4 | CNT = 4 |
| --- | --- |
| DSCD[7] = X5[7] XOR D[7] | DSCD[7] = S[0] XOR H[7] XOR D[7] |
| DSCD[6] = X5[6] XOR D[6] | DSCD[6] = X5[6] XOR H[6] XOR D[6] |
| DSCD[5] = X5[5] XOR D[5] | DSCD[5] = H[5] XOR D[5] |
| DSCD[4] = X5[4] XOR D[4] | DSCD[4] = H[4] XOR D[4] |
| DSCD[3] = X5[3] XOR D[3] | DSCD[3] = H[3] XOR D[3] |
| DSCD[2] = X5[2] XOR D[2] | DSCD[2] = H[2] XOR D[2] |
| DSCD[1] = X5[1] XOR D[1] | DSCD[1] = H[1] XOR D[1] |
| DSCD[0] = X5[0] XOR D[0] | DSCD[0] = H[0] XOR D[0] |

Figure 9:
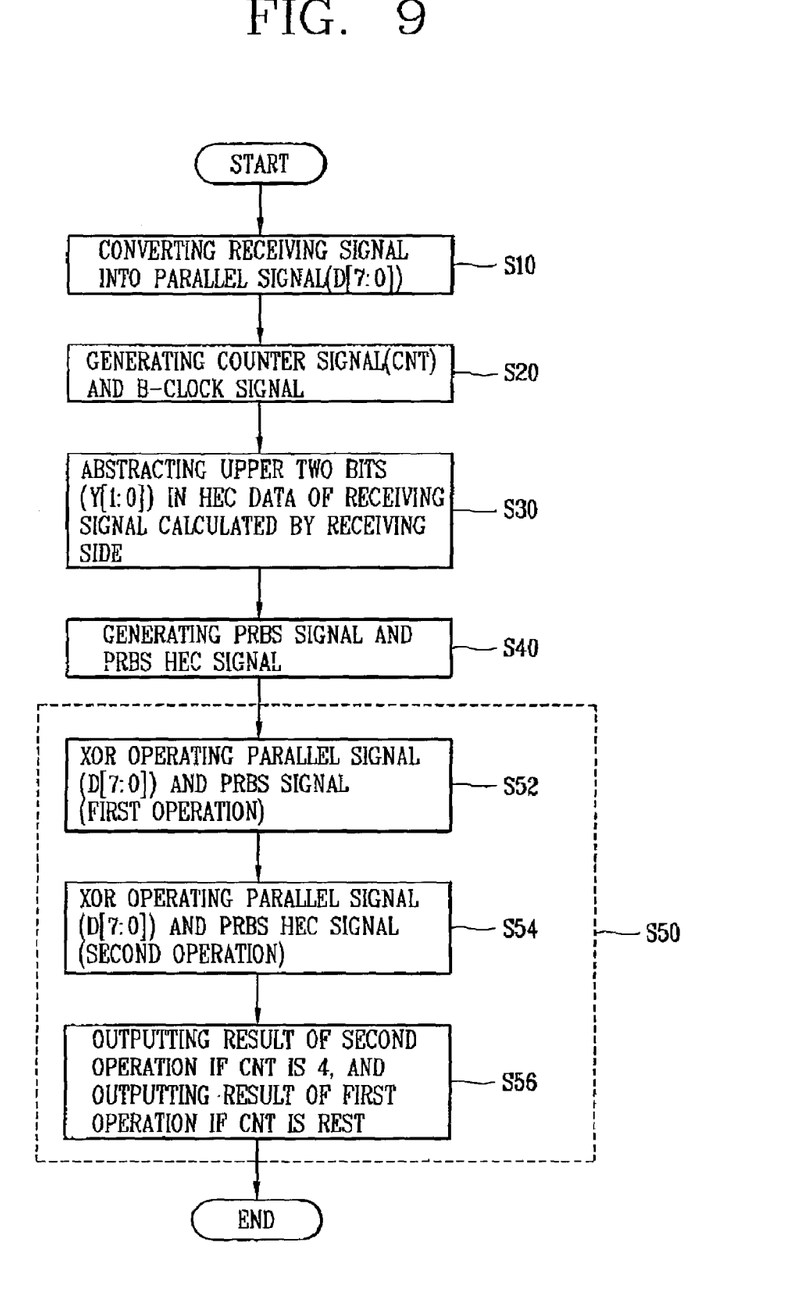
FIG. 9 is a flow chart illustrating descrambling in accordance with a preferred embodiment of the present invention.

FIG. 9 is a flow chart illustrating descrambling in accordance with the preferred embodiment. As shown in FIG. 9, the descrambling method in accordance with the preferred embodiment includes converting a received ATM cell signal into a parallel signal (D[7:0]) (S10). Next, a counter signal and a ⅛ speed clock signal (B-clock) of the sending end are generated (S20). The method further include, generating, HEC data of the receiving data by a CRC operation, and abstracting the upper two-bit signal (Y[1:0]) of the HEC data (S30). Next, a PRBS signal and a PRBS HEC signal are generated (S40) and the original signal in a byte unit is restored by receiving the parallel signal (D[7:0]), abstracted two-bit signal (Y[1:0]), PRBS signal, and the PRBS HEC signal (S50).

The original signal restoring step (S50) includes the steps of determining the value of the correction vector by comparing the PRBS synchronizing signal of the sending end and the PRBS synchronizing signal (not shown). This is done by first performing an exclusive-OR operation of the parallel signal (D[7:0]) and the PRBS signal (S52). Then an exclusive-OR operation of the parallel data (D[7:0]) and the PRBS HEC signal is performed (S54). Finally, the operation result of the second descrambling is outputted when CNT is 4, and the operation result of the first descrambling is outputted when CNT is the rest (S56).

The PRBS signal generation process (S40) includes generating a PRBS number sequence (not shown), generating a PRBS signal by performing an exclusive-OR operation of a correction vector and the PRBS number sequence (not shown), and abstracting a PRBS synchronizing signal of two bits from the PRBS signal (not shown).

The DSS of the preferred embodiment has various advantages. For example, since the parallel DSS apparatus lowers the clock speed of the 622 MHz into ⅛ speed (77.76 MHz) and operates serial desrambling processing in bit units by converting the processing into a parallel descrambling processing in byte units, power consumption can be reduced and a sufficient timing margin can be secured. As a high-speed serial processing is converted into a low-speed parallel processing, more accurate and sufficient timing margin can be obtained without a change of processing amount per hour of the descrambling processing apparatus.

The foregoing embodiments and advantages are merely exemplary and are not to be construed as limiting the present invention. The present teaching can be teaching applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalents structures.

What is claimed is:

1. A parallel distributed sample descrambling (DSS) apparatus of a passive optical network, comprising:
    a serial-parallel converter configured to convert received data into parallel data and generate a counter signal;
    a header error check (HEC) generator to receive the parallel data from the serial-parallel converter, to generate HEC data based on the received parallel data using a CRC calculation, and to abstract an upper two bits of the HEC data; and
    a descrambling processing unit to receive the two bits of the HEC data from the HEC generator and to receive the parallel data and the counter signal from the serial-parallel converter, and the descrambling processing unit to perform parallel descrambling of byte units based on the received signals from the serial-parallel converter and the HEC generator.

2. The apparatus of claim 1, wherein the parallel data has a configuration of D[7:0].

3. The apparatus of claim 1, wherein the serial-parallel converter outputs a clock signal of a sending end by reducing an original signal to ⅛ speed.

4. The apparatus of claim 1, wherein the descrambling processing unit is operated according to a ⅛ speed clock signal (B-clock) of a sending end.

5. The apparatus of claim 1, wherein the counter signal is a 6-bit binary signal which repeats counting from 0(10) to 52(10), according to a ⅛ speed clock signal.

6. The apparatus of claim 1, wherein the counter signal restarts counting in a module of a cell.

7. The apparatus of claim 1, wherein the descrambling processing unit comprises:
   a PRBS generation unit to generate a PRBS number sequence;
   a PRBS correction unit to generate a PRBS signal by performing an exclusive-OR operation of a correction vector and the PRBS number sequence, and to abstract a two-bit PRBS synchronizing signal from the PRBS signal;
   a PRBS HEC generation unit to generate a PRBS HEC signal by performing a CRC operation of an initial four bytes of the PRBS signal; and
   a descrambler to output the correction vector to the PRBS correction unit by generating the vector, and restoring the original signal by performing an exclusive-OR operation of the parallel data, the PRBS signal, and the PRBS HEC signal.

8. The apparatus of claim 7, wherein the PRBS correction unit corrects the PRBS signal when the correction vector has a value of '1'.

9. The apparatus of claim 7, wherein the PRBS synchronizing signal is a signal of an identical position as the sending side PRBS synchronizing signal among the PRBS signals generated by the PRBS correction unit.

10. The apparatus of claim 7, wherein the descrambler comprises:
    a correction vector generation unit that determines a value of the correction vector by comparing the PRBS synchronizing signal of a sending end and the PRBS synchronizing signal, and outputs the value of the correction vector to the PRBS correction unit;
    a first descrambling unit to perform an exclusive-OR operation of the parallel data and the PRBS signal;
    a second descrambling unit to perform an exclusive-OR operation of the parallel data and the PRBS HEC signal; and
    a selecting output unit to output an operation result of the second descrambling unit when the counter signal has a value of 4, and to output the operation result of the first descrambling unit when the counter value is not equal to 4.

11. The apparatus of claim 10, wherein the correction vector generation unit sets the value of the correction vector to '1' if the values from the comparing are different, and sets the value of the correction vector to '0' if the values from the comparing are equal.

12. The apparatus of claim 10, wherein the PRBS signal of the sending end is generated by performing the exclusive-OR operation of an upper two bits of the HEC data abstracted from received data with the output signal of the HEC generator.

13. The apparatus of claim 1, wherein the descrambling processing unit restores the original signal based on the parallel data, the abstracted two bits, a PRBS signal and a PRBS HEC signal.

14. A method for descrambling a parallel distributed sample of a passive optical network, comprising:
    converting received data into parallel data having a format of D[7:0];
    generating a counter signal and a clock signal having a speed of ⅛ a speed of a clock signal from a sending end;
    generating header error check (HEC) data of the received data by a cyclic redundancy check (CRC) operation, and abstracting an upper two bits (Y[1:0]) of the HEC data;
    generating a PRBS signal;
    generating a PRBS HEC signal by performing the CRC operation of an initial four bytes of the PRBS signal; and
    restoring the original signal in unit of byte by receiving the parallel data (D[7:0]), the abstracted two bits (Y[1:0]), the PRBS signal, and the PRBS HEC signal.

15. The method of claim 14, wherein the restoring is performed according to the speed of the ⅛ speed clock signal.

16. The method of claim 14, wherein the counter signal is a 6-bit binary signal that repeats counting from 0(10) to 52(10) according to the speed of the ⅛ speed clock signal.

17. The method of claim 14, wherein the counter signal restarts the counting in unit of cell.

18. The method of claim 14, wherein generating the PRBS signal comprises:
    generating a PRBS number sequence;
    generating a PRBS signal by performing an exclusive-OR operation of a correction vector and the PRBS number sequence; and
    abstracting a PRBS synchronizing signal of two bits from the PRBS signal.

19. The method of claim 18, wherein the PRBS synchronizing signal is a signal of an identical position as the PRBS synchronizing signal of a sending side among the generated PRBS signals.

20. The method of claim 14, wherein the restoring comprises:
    determining a value of a correction vector by comparing a PRBS synchronizing signal of the sending end and a PRBS synchronizing signal;
    performing an exclusive-OR operation of the parallel data (D[7:0]) and the PRBS signal;
    performing the exclusive-OR operation of the parallel data (D[7:0]) and the PRBS HEC signal; and
    outputting an operation result of the second descrambling when the counter signal has a value of 4, and outputting the operation result of the first descrambling when the counter signal has a value other than 4.

21. The method of claim 20, wherein determining the value of the correction vector sets the value of the correction vector as '1' if the comparison values are different, and sets the value of the correction vector as '0' if the comparison values are equal.

22. The method of claim 20, wherein the PRBS signal of the sending end is generated by performing an exclusive-OR operation of an upper two bits of the HEC data abstracted from the received data and the output signal of a HEC generation unit.

23. A method for descrambling a parallel distributed sample comprising:
    converting received data into parallel data;
    generating a counter signal based on the received data;
    abstracting two bits of header error check (HEC) data based on the received data;
    generating a PRBS HEC signal by performing a cyclic redundancy check (CRC) operation of a PRBS signal; and restoring the original signal based on the parallel data, the abstracted two bits, the PRBS signal, and the PRBS HEC signal.

24. The method of claim 23, wherein generating the PRBS HEC signal comprises:
    generating a PRBS number sequence;
    generating a PRBS signal by performing an exclusive-OR operation of a correction vector and the PRBS number sequence; and
    abstracting a PRBS synchronizing signal of two bits from the PRBS signal.

25. The method of claim 23, wherein the restoring comprises:
    determining a value of a correction vector by comparing a PRBS synchronizing signal of a sending end and a PRBS synchronizing signal;
    performing an exclusive-OR operation of the parallel data and the PRBS signal;
    performing the exclusive-OR operation of the parallel data and the PRBS HEC signal; and
    outputting an operation result of descrambling based on the counter signal.

26. A parallel distributed sample descrambling apparatus comprising:
    a serial-parallel converter to convert received data into parallel data and a counter signal;
    a header error check (HEC) generator to generate HEC data based on the received data and to abstract upper bits of the HEC data; and
    a descrambling processing unit to perform parallel descrambling based on the parallel data and the upper bits of the HEC data, wherein the descrambling processing unit comprises:
        a PRBS generation unit to generate a PRBS number sequence;
        a PRBS correction unit to generate a PRBS signal by performing an exclusive-OR operation of a correction vector and the PRBS number sequence and to abstract a two-bit PRBS synchronizing signal from the PRBS signal;
        a PRBS HEC generation unit to generate a PRBS HEC signal based on a cyclic redundancy check (CRC) operation of the PRBS signal; and
        a descrambler to output the correction vector to the PRBS correction unit by generating the vector, and restoring the original signal by performing an exclusive-OR operation of the parallel data, the PRBS signal and the PRBS HEC signal.

27. The apparatus of claim 26, wherein the descrambler comprises:
    a correction vector generation unit to determine a value of the correction vector by comparing the PRBS synchronizing signal of a sending end and the PRBS synchronizing signal and to output the value of the correction vector to the PRBS correction unit;
    a first descrambling unit to perform an exclusive-OR operation of the parallel data and the PRBS signal;
    a second descrambling unit to perform an exclusive-OR operation of the parallel data and the PRBS HEC signal; and
    a selecting output unit to output an operation result of the second descrambling unit based on the counter signal.

* * * * *